United States Patent
Blinnikka et al.

(10) Patent No.: US 9,916,587 B2
(45) Date of Patent: Mar. 13, 2018

(54) COMPUTERIZED SYSTEM AND METHOD FOR CREATING A MODIFIED VERSION OF A DIGITAL TICKER DATA FEED BY CREATING AND INSERTING A DIGITAL CONTENT ITEM INTO THE DIGITAL TICKER DATA FEED

(75) Inventors: Tomi Blinnikka, Berkeley, CA (US); Steven Horowitz, Oakland, CA (US)

(73) Assignee: EXCALIBUR IP, LLC, New York, NY (US)

( * ) Notice: Subject to any disclaimer, the term of this patent is extended or adjusted under 35 U.S.C. 154(b) by 1656 days.

(21) Appl. No.: 11/747,114

(22) Filed: May 10, 2007

(65) Prior Publication Data

US 2008/0103899 A1    May 1, 2008

Related U.S. Application Data

(63) Continuation-in-part of application No. 11/552,812, filed on Oct. 25, 2006.

(51) Int. Cl.
*G06Q 30/00* (2012.01)
*G06Q 30/02* (2012.01)

(52) U.S. Cl.
CPC ............. *G06Q 30/02* (2013.01); *G06Q 30/00* (2013.01); *G06Q 30/0251* (2013.01); *G06Q 30/0273* (2013.01); *G06Q 30/0277* (2013.01)

(58) Field of Classification Search
None
See application file for complete search history.

(56) References Cited

U.S. PATENT DOCUMENTS

| | | | | |
|---|---|---|---|---|
| 5,697,793 | A  * | 12/1997 | Huffman | G06F 15/0283 434/156 |
| 5,743,746 | A  * | 4/1998 | Ho | G09B 5/14 434/332 |
| 6,704,930 | B1 * | 3/2004 | Eldering | H04N 5/44543 348/385.1 |
| 7,394,850 | B1 * | 7/2008 | Gordon | H04N 21/23424 375/240.01 |
| 7,421,454 | B2 * | 9/2008 | DeShan | G06Q 30/02 |
| 2002/0032677 | A1 * | 3/2002 | Morgenthaler | G06F 17/30781 |
| 2003/0226142 | A1 * | 12/2003 | Rand | H04N 7/165 725/32 |
| 2004/0003402 | A1 * | 1/2004 | McKenna, Jr. | G06F 3/0481 725/46 |

(Continued)

OTHER PUBLICATIONS

Non-Final Office Action from U.S. Appl. No. 11/552,812 dated Aug. 31, 2010; 17 pages.

*Primary Examiner* — Luis A Brown
(74) *Attorney, Agent, or Firm* — James J. DeCarlo; Greenberg Traurig, LLP

(57) ABSTRACT

Systems and methods are disclosed for automatically adding advertisements into a ticker. The disclosure includes receiving a request for a ticker data feed and generating a modified ticker data feed from the original data feed. One or more advertisements are selected and inserted as data items into the modified ticker data feed. The modified ticker data feed is then transmitted to the requester. When rendered on the requestor's device, the modified ticker data feed displays the data items of the originally requested data feed along with the advertisements in a scrolling ticker.

14 Claims, 8 Drawing Sheets

(56) References Cited

U.S. PATENT DOCUMENTS

| | | | |
|---|---|---|---|
| 2004/0003406 A1* | 1/2004 | Billmaier | G06F 1/3203 725/60 |
| 2004/0003412 A1* | 1/2004 | Halbert | H04N 21/2542 725/112 |
| 2004/0015608 A1* | 1/2004 | Ellis | G06Q 30/02 709/246 |
| 2005/0010950 A1* | 1/2005 | Carney | H04N 21/23424 725/45 |
| 2005/0188403 A1* | 8/2005 | Kotzin | G06F 17/30056 725/47 |
| 2005/0193010 A1* | 9/2005 | DeShan et al. | 707/104.1 |
| 2005/0210145 A1* | 9/2005 | Kim | G06F 17/30849 709/231 |
| 2006/0026655 A1* | 2/2006 | Perez | G06Q 30/02 725/91 |
| 2006/0242201 A1* | 10/2006 | Cobb | G06Q 30/02 |
| 2006/0248209 A1* | 11/2006 | Chiu | G06Q 30/02 709/231 |
| 2006/0268667 A1* | 11/2006 | Jellison, Jr. | G06F 17/30056 369/30.08 |
| 2007/0040850 A1* | 2/2007 | Coleman | 345/629 |
| 2007/0078712 A1* | 4/2007 | Ott, IV | G06Q 30/02 705/14.69 |
| 2007/0078713 A1* | 4/2007 | Ottt, IV | G06Q 30/02 705/14.61 |
| 2007/0078714 A1* | 4/2007 | Ott, IV | G06Q 30/02 705/14.53 |
| 2007/0094083 A1* | 4/2007 | Yruski | G06Q 30/02 705/14.66 |
| 2007/0094363 A1* | 4/2007 | Yruski | H04L 67/20 709/220 |
| 2007/0157228 A1* | 7/2007 | Bayer | G06Q 30/02 725/34 |
| 2007/0162850 A1* | 7/2007 | Adler | G06F 9/4443 715/700 |
| 2007/0240232 A1* | 10/2007 | Pino | H04N 7/17336 726/28 |
| 2008/0021710 A1* | 1/2008 | Ho | G06F 17/30746 704/270.1 |
| 2008/0021775 A1* | 1/2008 | Lerman | G06Q 30/02 705/14.73 |
| 2008/0040215 A1* | 2/2008 | Huang | G06Q 30/02 705/14.73 |
| 2008/0263472 A1* | 10/2008 | Thukral | G06F 3/0482 715/774 |

* cited by examiner

```
<?xml version="1.0" encoding="iso-8859-1"?>
<rss xmlns:media="http://search.yahoo.com/mrss" version="2.0">
  <channel>
    <title>Entertainment Photos on Yahoo! News Photos</title>
    <link>http://news.yahoo.com/photos/ss/207</link>
    <description>Entertainment Photos on Yahoo! News Photos</description>
    <pubDate>Wed, 28 Jun 2006 17:54:57 GMT</pubDate>
    <lastBuildDate>Wed, 28 Jun 2006 17:54:57 GMT</lastBuildDate>
    <generator>http://rss.news.yahoo.com/</generator>
    <image>
      <width>142</width>
      <height>18</height>
      <url>http://us.i1.yimg.com/us.yimg.com/i/us/nws/th/main_142b.gif</url>
      <title>Entertainment Photos on Yahoo! News Photos</title>
      <link>http://us.rd.yahoo.com/dailynews/rss/photos/categories/207/index/
*http://news.yahoo.com/photos/ss/207</link>
    </image>
    <item>
      <title>Whether NBC is showcasing talent on America's Got Talent is ...</title>
      <link>http://us.rd.yahoo.com/dailynews/rss/photos/categories/207/index/
*http://news.yahoo.com/photos/ss/207/im:/060628/photos_eo_en/
dc71c308fb6be355415fb8449c932524</link>
      <description>
        <![CDATA[<p><a href="http://us.rd.yahoo.com/dailynews/rss/photos/categories/
207/index/*http://news.yahoo.com/photos/ss/207/im:/060628/photos_eo_en/
dc71c308fb6be355415fb8449c932524"><img src="http://us.news3.yimg.com/us.i2.yimg.com/
p/eo/20060628/
capt.dc71c308fb6be355415fb8449c932524.jpg?x=99&y=130&sig=dfNoGXVAGtiooYy_jUP
C3A--" align="left" height="130" width="99" alt="photo" title="Whether NBC is
showcasing talent on America's Got Talent is
 debatable. What isn't is that the network is reaping viewers." border="0" /></a>(E!
Online) - Whether NBC is showcasing talent on America's Got Talent is
 debatable. What isn't is that the network is reaping viewers.</p><br clear=all>]]>
      </description>
      <author>(E! Online)</author>
      <pubDate>Wed, 28 Jun 2006 17:54:57 GMT</pubDate>
      <guid isPermaLink="false">http://us.news3.yimg.com/us.i2.yimg.com/p/eo/
20060628/
capt.dc71c308fb6be355415fb8449c932524.jpg?x=99&y=130&sig=dfNoGXVAGtiooYy_jUP
C3A--</guid>
      <media:content url="http://us.news3.yimg.com/us.i2.yimg.com/p/eo/20060628/
capt.dc71c308fb6be355415fb8449c932524.jpg?x=99&y=130&sig=dfNoGXVAGtiooYy_jUP
C3A--" type="image/jpeg" height="130" width="99"/>
      <media:title>Whether NBC is showcasing talent on America's Got Talent is ...</
media:title>
      <media:text>
        <![CDATA[<p><a href="http://us.rd.yahoo.com/dailynews/rss/photos/categories/
207/index/*http://news.yahoo.com/photos/ss/207/im:/060628/photos_eo_en/
dc71c308fb6be355415fb8449c932524"><img src="http://us.news3.yimg.com/us.i2.yimg.com/
p/eo/20060628/
capt.dc71c308fb6be355415fb8449c932524.jpg?x=99&y=130&sig=dfNoGXVAGtiooYy_jUP
C3A--" align="left" height="130" width="99" alt="photo" title="Whether NBC is
showcasing talent on America's Got Talent is
 debatable. What isn't is that the network is reaping viewers." border="0"/></a>(E!
Online) - Whether NBC is showcasing talent on America's Got Talent is
 debatable. What isn't is that the network is reaping viewers.</p><br clear=all>]]>
```

FIG. 4A

```
            </media:text>
            <media:credit role="provider">(E! Online)</media:credit>
        </item>
        <item>
            <title>David Mirvish, producer of the 'Lord of the Rings' musical, ...</title>
            <link>http://us.rd.yahoo.com/dailynews/rss/photos/categories/207/index/
*http://news.yahoo.com/photos/ss/207/im:/060628/ids_photos_en/r1003059574.jpg</link>
            <description><![CDATA[<p><a

...

Toronto on September 3, 2006.  REUTERS/Peter Jones    (CANADA)</p><br
clear=all>]]></media:text>
            <media:credit role="provider">(Reuters)</media:credit>
        </item>
        <item>
            <title>AD: Yahoo! Small Business</title>
            <link>http://sbs.smallbusiness.yahoo.com/domains/</link>
            <description>ADVERTISEMENT: What's in a domain name? A lot more than you
might think. Your domain name can be your first impression, your face to the
outside world, and your new marketing plan.</description>
            <guid isPermaLink="false"></guid>
            <pubDate>Wed, 28 Jun 2006 18:01:32 GMT</pubDate>
            <media:title>AD: Yahoo! Small Business</media:title>
            <media:text>ADVERTISEMENT: What's in a domain name? A lot more than you
might think. Your domain name can be your first impression, your face to the
outside world, and your new marketing plan.</media:text>
            <media:content type="image/png" url="http://apil-mig.media.mud.yahoo.com/
News/RSSAds/images/15.png"/>
        </item>
        <item>
            <title>David Mirvish, producer of the 'Lord of the Rings' musical, ...</title>
            <link>http://us.rd.yahoo.com/dailynews/rss/photos/categories/207/index/
*http://news.yahoo.com/photos/ss/207/im:/060628/ids_photos_en/r1120367786.jpg</link>
            <description><![CDATA[<p><a

...

conference in Toronto June 28, 2006. REUTERS/Peter Jones</p><br clear=all>]]></media:text>
            <media:credit role="provider">(Reuters)</media:credit>
        </item>
        <!-- Remainder of file trimmed for sample -->
    </channel>
</rss>
```

FIG. 4B

COMPUTERIZED SYSTEM AND METHOD FOR CREATING A MODIFIED VERSION OF A DIGITAL TICKER DATA FEED BY CREATING AND INSERTING A DIGITAL CONTENT ITEM INTO THE DIGITAL TICKER DATA FEED

RELATED APPLICATIONS

This application is a continuation-in-part of prior application Ser. No. 11/552,812, filed Oct. 25, 2006, which application is hereby incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

A data feed is an electronic document (often XML-based) which contains content items, such as summaries of stories, media files or weblog posts with web links to the associated story, media file or posts. Weblogs and news websites are common sources for data feeds, but feeds are also used to deliver structured information ranging from weather data, to image files (often referred to as slides), to "top ten" lists of hit songs. The two main data feed formats are RSS (which is older and far more widely used) and Atom (a newer format that has just completed the standardization process). RSS is a family of data feed formats, specified in XML and used for Web syndication. Atom is an open standard that includes both an XML-based web syndication format used by weblogs, news websites and web mail, and an HTTP-based protocol for remote editing of Atom-based weblogs.

The terms "publishing a feed" and "syndication" are used to describe making available a feed to client computers. Like syndicated print newspaper features or broadcast programs, data feed contents may be shared and republished by other web sites. (For that reason, one popular definition of RSS is "Really Simple Syndication.")

One new application of data feeds is to use data feeds as a means for delivering an electronic "slide show" of related images and image descriptions. In this application, most or all of the individual content items of the slide show data feed include a link to an image (the "slide") and a brief description of the slide ("caption"). When the slide show data feed is accessed, the first content item of the feed, i.e., the first slide and its associated caption, is displayed to the viewer in the viewer's browser or other client application. The display may further be provided with user-selectable buttons that control the display of the other content items, or the slide show may be timed so that the content items are displayed in a sequence over time.

Data feeds have become a very popular and accepted media delivery paradigm. This success has caused the number and variety of data feeds available to clients to grow exponentially. Potential data feed consumers are now confronted with the problems of how to find data feeds and how to organize and manage their subscriptions. Data feed publishers are also confronted with problems including how to market their data feeds effectively, how to generate income from their data feeds, how to create and disseminate data feeds easily, how to support different feed formats and device needs, and how to manage bandwidth and storage costs.

One way of commercializing data feeds is to deliver the data feeds within a window around which advertisements are presented to the user. This is useful because the data feeds need not be changed in order to present them within the advertising window. However, consumers have quickly learned to ignore the advertisements and focus on the data feed content. Furthermore, there is no room for the advertisements in desktop applications now designed to occupy the minimum area of a display screen needed to convey just the media content.

SUMMARY

Systems and methods are disclosed for automatically adding advertisements into a ticker. The disclosure includes receiving a request for a ticker data feed and generating a modified ticker data feed from the original data feed. One or more advertisements are selected and inserted as data items into the modified ticker data feed. The modified ticker data feed is then transmitted to the requester. When rendered on the requestor's device, the modified ticker data feed displays the data items of the originally requested data feed along with the advertisements in a scrolling ticker.

In one aspect, the disclosure describes a method for automatically adding advertisements into a ticker data feed. The method includes receiving a request from a requesting computing device for the ticker data feed, in which the ticker data feed contains one or more data items that, when rendered on the requesting computing device, are sequentially displayed in a ticker display window. The method then determines that the ticker data feed is to be provided with at least one advertisement and selects a ticker advertisement for insertion into the ticker data feed. The ticker data feed is then accessed, such as by retrieving a copy of the data feed and a modified data feed is created. The modified data feed contains at least some, if not all, of the one or more data items in the ticker data feed. The method includes identifying a location relative to the one or more data items in the modified data feed for insertion of the ticker advertisement and inserting an advertisement item in the location. The modified data feed is then communicated to the requesting computing device.

In another aspect, the disclosure describes a system for generating a ticker data feed comprising a communication module adapted to receive requests for the ticker data feed and a data feed generator adapted to access the ticker data feed and generate a modified data feed in response to the requests received by the communication module. The modified data feed contains data items from the ticker data feed and at least one advertisement item. The system also includes an advertisement selection module adapted to select an advertisement from a set of advertisements accessible to the advertisement selection module and communicate the selected advertisement to the data feed generator.

In yet another aspect, the disclosure describes a method for automatically adding advertisements into a ticker data stream. The method includes receiving a request from a requesting computing device for a first data stream containing items and determining that the first data stream is to be provided with advertisements. The method also includes selecting an advertisement for insertion into the first data stream. The first data stream is accessed and a modified data stream is created therefrom. The modified data stream contains one or more of the items in the first data stream. The method further includes identifying a location among the items for insertion of the advertisement and inserting an advertisement item in the location. In response to the request for the first data stream, the method then transmits the modified data stream to the requesting computing device.

These and various other features as well as advantages will be apparent from a reading of the following detailed description and a review of the associated drawings. Additional features are set forth in the description which follows, and in part will be apparent from the description, or may be learned by practice of the described embodiments. The benefits and features will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The following drawing figures, which form a part of this application, are illustrative of embodiments, systems and methods described below and are not meant to limit the scope of the invention in any manner, which scope shall be based on the claims appended hereto.

FIGS. 4A and 4B illustrate the XML code of the modified data feed shown in FIG. 3.

DETAILED DESCRIPTION

Figure 1:
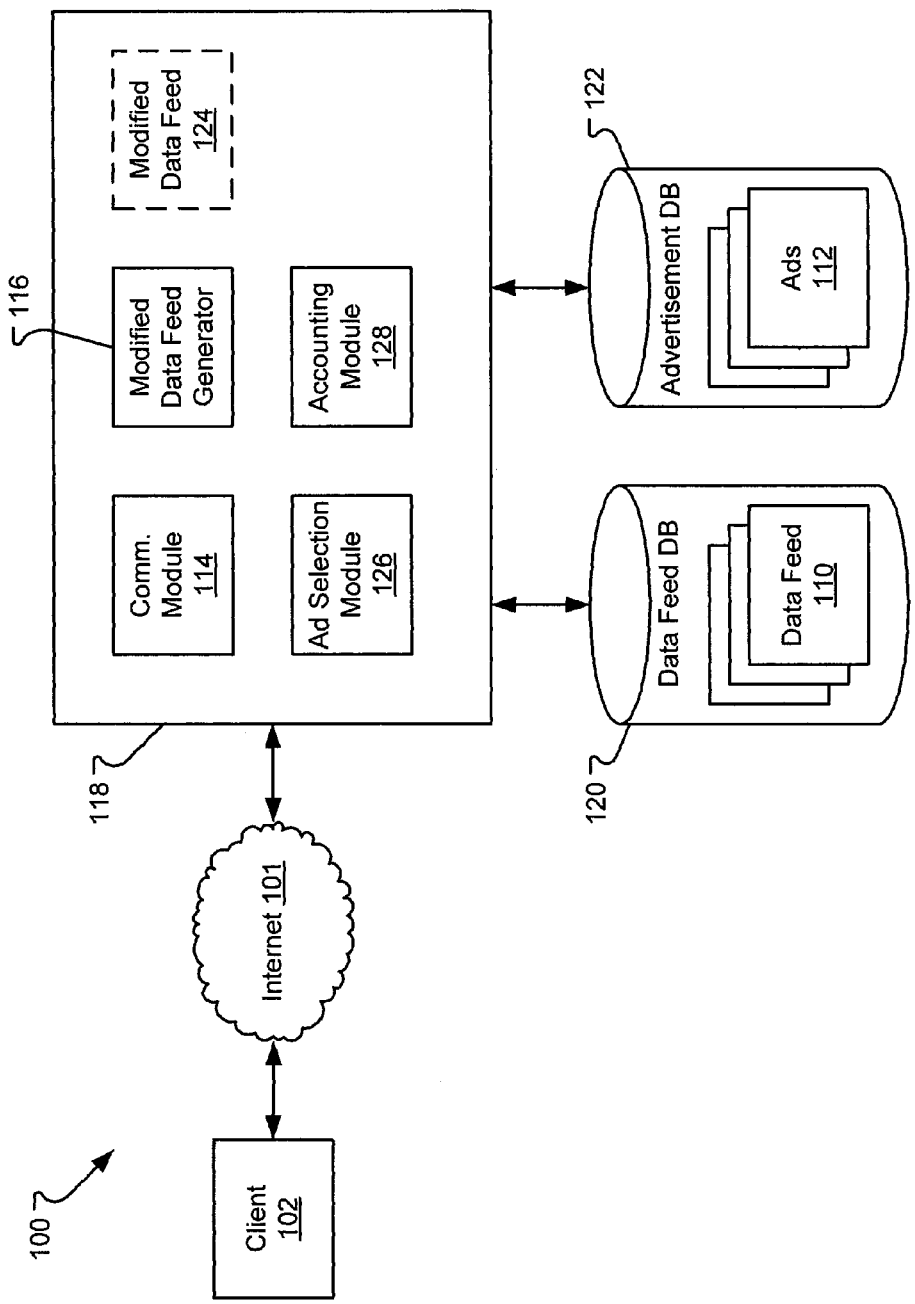
FIG. 1 is a client-server computing architecture illustrating an embodiment of an advertisement system adapted to insert advertisements into a data feed.

FIG. 1 is a client-server computing architecture illustrating an embodiment of an advertisement system adapted to insert advertisements into a data feed. Data feeds may be commonly referred to as "web feeds" but the broader term data feed is used herein to remind the reader that feed definitions do not require use over the Internet/World Wide Web via an HTTP protocol. Although the embodiments are described in terms of a slide show data feed, other types of data feeds are also contemplated and the system may be adapted to insert advertisement items into any data feed. For example, the systems and methods herein may be easily adapted for use with a slideshow application on a set-top box via IPTV, which would not be considered a web feed, even if the feed format is RSS. Also, in the case of a non-browser desktop application, the information may be received via UDP or some other non-Web protocol.

In an embodiment, a computing device such as the client 102 or server 118 includes a processor and memory for storing data and software. In an embodiment, computing devices are further provided with operating systems and can execute software applications in order to manipulate data. In the computing device, local files, such as media files, may be stored on a mass storage device (not shown) that is connected to or part of any of the computing devices described herein including the client 102 or a server 118. A mass storage device and its associated computer-readable media, provide non-volatile storage for the client 102. Although the description of computer-readable media contained herein refers to a mass storage device, such as a hard disk or CD-ROM drive, it should be appreciated by those skilled in the art that computer-readable media can be any available media that can be accessed by the client 102.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

In the architecture 100 shown, a client 102 is connected to a server 118 via a network, such as the Internet 101 as shown. The client 102 is adapted to issue requests to the server computer 118 for slide show data feeds 110. In response, the server computer 118 creates a modified data feed 124 containing one or more advertisements 112 and transmits the modified data feed back to the client 102 as described in greater detail below.

The client 102 is a computing device, such as a personal computer (PC), web-enabled personal data assistant (PDA) a smart phone or a smart TV set top box. The client 102 is connected to the Internet 101 via a wired data connection or wireless connection such as a wi-fi network, a WiMAX (802.16) network, a satellite network or cellular telephone network.

In the embodiment shown, the client 102 includes an application for receiving and rendering a slide show, for example, an Internet browser, such as that offered by Microsoft Corporation under the trade name INTERNET EXPLORER, or that offered by Netscape Corp. under the trade name NETSCAPE NAVIGATOR, or the software or hardware equivalent of the aforementioned components that enable networked intercommunication between users and service providers and/or among users.

The architecture 100 also includes server 118, which may be a single server or a group of servers acting together. A number of program modules and data files may be stored in a mass storage device and RAM of the server 118, including an operating system suitable for controlling the operation of a networked server computer, such as the LINUX operating system for example. The mass storage device and RAM may also store one or more application programs.

In particular, the server 118 may include a communication module 114 for receiving and responding to client requests, including hypertext transport protocol ("HTTP") requests generated by client browsers. The communication module 114 is adapted to receive client requests and pass those requests on to other modules in the server 118 or accessible to the server 118. In the embodiment shown, the communication module 114 receives requests for slide show data feed requests and passes the requests to the modified data feed generator 116 for processing. Depending on the embodiment, all requests may be passed on to the modified data feed generator 116 or the communication module 114 may only pass on requests for data feeds known to be handled by the modified data feed generator 116. The communication module 114 may be adapted to simply route a request to the modified data feed generator 116 or, alternatively, generate and transmit a second request based on the request received from the client 102.

The modified data feed generator 116 is adapted to receive information indicating that the client 102 has requested a slide show data feed 110 accessible to the data feed generator 116. Such data feeds may be located on the server 118 or in a remote storage location, such as a data server (not shown). In the embodiment shown, the data feed 110 in one of a set of data feeds 110 maintained in a data feed database 120, which as discussed above, may be located on the server 118 or at a remote location.

The modified data feed generator 116, as described in greater detail below, receives the request information and generates a modified data feed 124 based on the requested slide show data feed 110. The modified data feed 124 contains some or all of the content items of the slide show data feed 110 and at least one advertisement item that when rendered by the client 102 displays an advertisement 112 to the user. Thus, the advertisements are selected and inserted into the modified data feed dynamically in response to a current client request allowing real time selection of new or different advertisements over the published life of the data feed 110.

As part of the generation process the modified data feed generator 116 may access the data feed 110 in order to copy at least some of its static contents. For example, in an embodiment, a complete copy of the data feed 110 is created and then modified to create the modified data feed 124. In an alternative embodiment, an empty modified data feed 124 is created and only the selected to necessary portions, such as one or more content items, of the data feed 110 are copied into the modified data feed 124.

The modified data feed 124 includes at least some of the content items of the requested data feed 110 and also includes one or more advertisements, in the form of advertisement items. These advertisement items are similar to the slide items in that they are made to be viewed within the slide show. Thus, in an embodiment, the advertisements are themselves slides that are accompanied by a textual advertisement-related message.

In an embodiment, as part of the process of generating the modified data feed 124, the modified data feed generator 116 may request one or more advertisements from an advertisement selection module 126. The advertisement selection module 126 selects one or more advertisements 112 from a set of advertisements, such as the advertisement database 122 as shown.

Depending on the embodiment, the advertisement database 122 may include different information. For example, in an embodiment the advertisement database 122 may include an advertisement item for each advertisement for insertion into a modified data feed. In an alternative embodiment, the advertisement database 122 may include the information necessary to create an advertisement item for an advertisement, such as the network location of advertisement's image (which could be remote from the server 118 and the advertisement database 122, such as on the advertiser's system) and a text description of the advertisement. In yet another embodiment, the advertisement database 122 may include the actual advertisement image. In addition, advertisement items inserted into the slide show could be other than a static image. For example, the advertisement item could be an animated GIF, Flash or even video. A slideshow player with the associated capability could play any one of these in the same window as the slide images.

The selected advertisement or advertisements are then communicated to the modified data feed generator 116. The communication may be of an advertisement item ready for insertion into the modified data feed 124, or of information allowing the modified data feed generator 116 to create the advertisement item.

The advertisement selection module 126 may include selection criteria and other information about what advertisements should and should not be used with any particular data feed 110. The advertisement selection module 126 may also include information about how many advertisements should be selected for any given data feed 110. In an alternative embodiment, some or all of the advertisement selection functions may be performed by the modified data feed generator 116.

Upon completion, the modified data feed 124 is then transmitted to the client 102. The transmission may be made through the communication module 114, directly from the modified data feed generator 116, or via some other route. In an embodiment, the client 102 is unaware that the modified data feed 124 received is not an exact copy of the requested data feed 110.

The modified data feed 124 is illustrated with a dotted line to indicate that the modified data feed 124 does not necessarily correspond to an electronic data structure stored on the server 118. In an embodiment, the modified data feed 124 may be managed in the same manner as a dynamic web page, even though the data feed 110 is a static web page. For example, in an embodiment every request for a data feed 110 could result in the creation and transmittal of a new modified data feed 124, none of which are retained after transmittal to the client 102. Alternative embodiments are also possible with modified data feeds 124 being cached for a period of time before being regenerated by the modified data feed generator 116.

The server 118 is also provided with an accounting module 128. The accounting module 128 tracks the advertisements 112 selected and included in modified data feeds 124 and transmitted to clients 102. For example, the number of times a given advertisement 112 is included in modified data feeds 124 may be recorded. This information may then be used to generate a bill to the advertiser, thus, allowing the bill to be based on the number of times the advertisement was transmitted to potential viewers. Alternatively, rather than "server-side counting" advertisements may be monitored by what is known as "client-side counting." The may be preferred as counting ads sent by the server does not represent true ad impressions of the client. In client-side counting, the browser or client app is instrumented ("beaconed") so that it sends back an acknowledgement that the ad was rendered. These acknowledgements then may also alert the server of advertisements rendered by different applications or in different contexts unrelated to the particular server.

The information tracked by the accounting module 128 may also include information derived from the client request, such as the client's identity and demographic information. Some or all of the client information may be obtained by cross-referencing information from the client request with user and account data accessible to the server 118. This information may also be used when generating the bill as the advertiser may be billed differently for different types of users or different demographics. In addition, this information may or may not be provided to the advertiser as an additional benefit.

Figure 5:
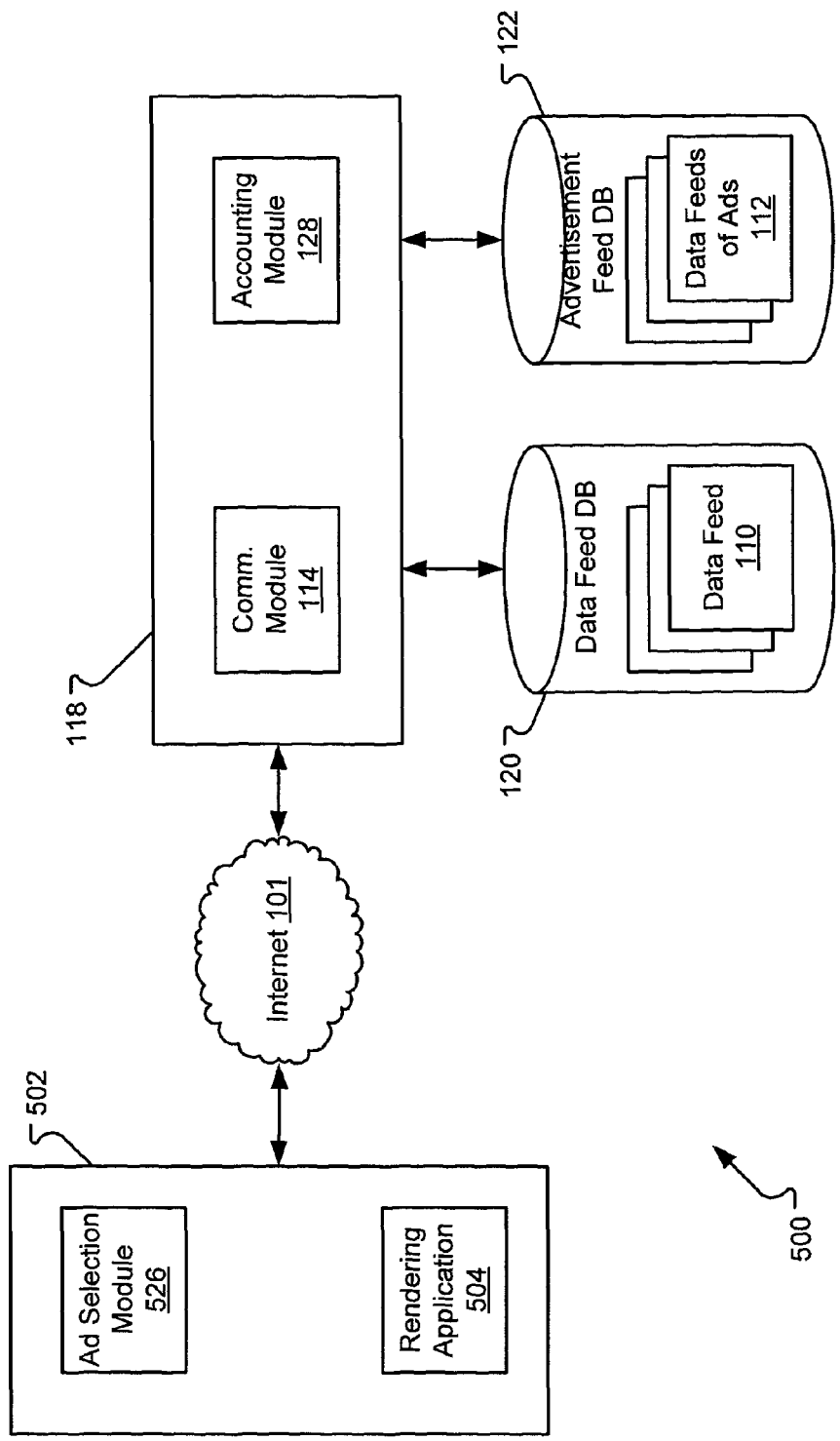
FIG. 5 illustrates one possible client-side implementation of a system for inserting advertisements into a slide show.

The embodiment shown in FIG. 1 illustrates one possible server-side implementation of an advertisement insertion system. Other server-side and client-side implementations are possible. For example, FIG. 5 illustrates one possible client-side implementation of a system 500 for inserting advertisements into a slide show. In the embodiment shown, the ad selection module 526 resides on the client 502 and may make a call to a remote service such as the server 118 for advertisements. The advertisements themselves may be maintained in a data feed format such that the ad selection module 526 may retrieve the ads by requesting a data feed 512 of ads. In the embodiment, the advertisements may then be inserted "on the fly" as the slides of a web feed 110 are displayed to the user by the rendering application 504. In this embodiment, no modified data feed may be necessary or created.

Client-side implementations allow for different selection criteria such as display advertisements after a specified period of time. In the embodiment, the client may, in effect, be interleaving slides from two sources, such as the slide data feed 110 and the ad data feed 512.

Figure 2:
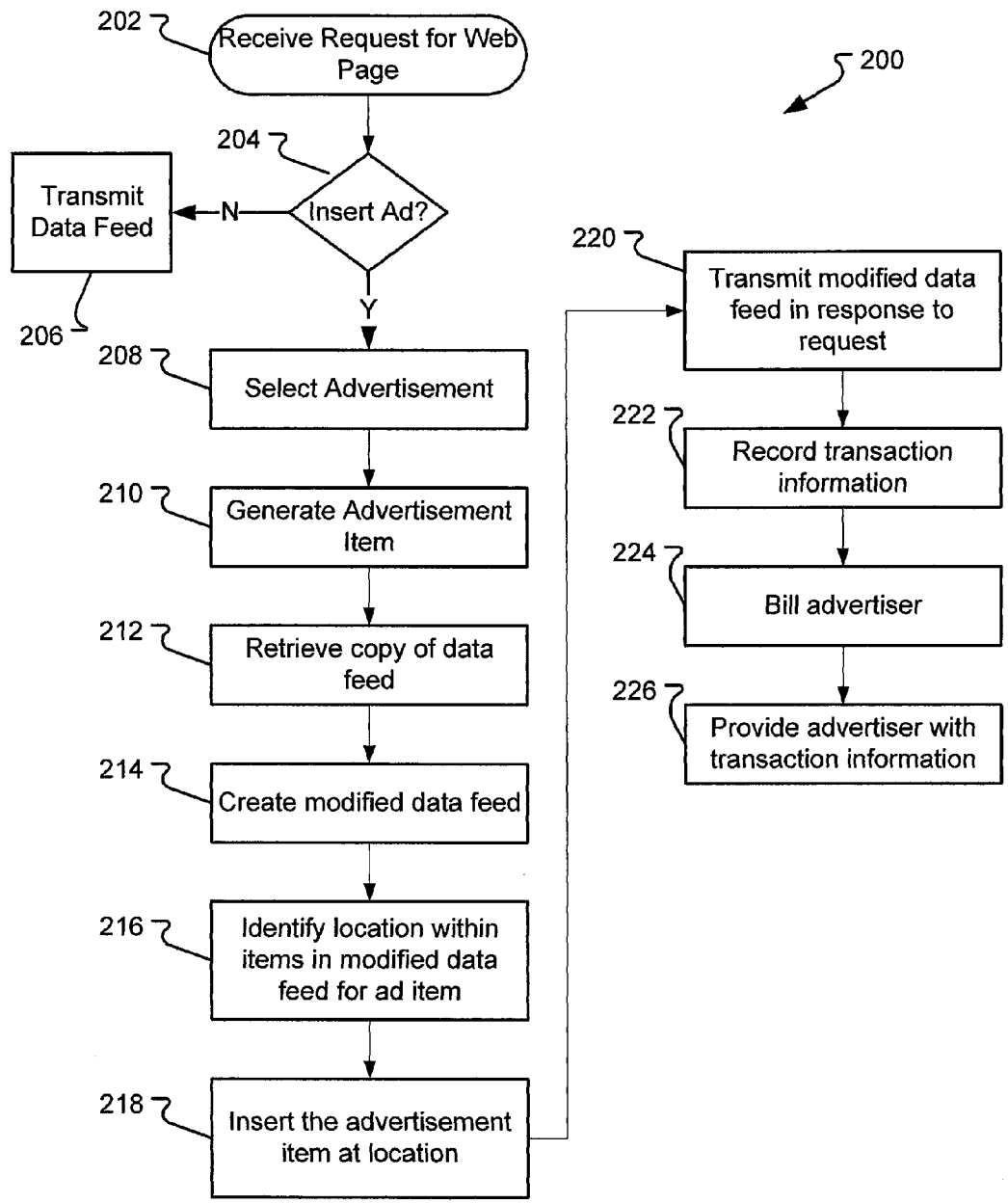
FIG. 2 illustrates a flowchart of an embodiment of a method for inserting advertisements into a slide show.

FIG. 2 illustrates a flowchart of an embodiment of a method for inserting advertisements into a slide show. In the embodiment shown, the method begins with the receipt of a request for a slide show data feed in a receive request for data feed operation 202. The request may include a URL or other identifier of the data feed being requested. In addition, the request may include or be associated with information identifying the client device making the request and the identity of the device's user.

After the request is received, a determination operation 204 determines if an advertisement should be inserted into the data feed transmitted back to the client device. This determination may be made based on the identity of the data feed, the identity of the device's user or any other information or criteria known at the time the request is received. For example, the determination may be made based on whether the requested data feed is a data feed for which an advertiser will pay to have advertisements inserted into. Such information may be located in a dynamic look up table that is revised as advertisers contract with the advertising insertion system operator.

If the determination operation 204 determines that no advertisement is to be inserted, then the data feed that was requested is transmitted without modification to the client device in response to the request in a transmit data feed operation 206.

If the determination operation 204 determines that an advertisement is to be inserted, then a selection advertisement operation 208 is performed. In an embodiment, the selection advertisement operation 208 is a dynamic operation in which one or more of a set of advertisements is selected to be inserted into the response to the client request.

The selection operation 208 may make a selection based on criteria provided by the advertiser or by the system operator. For example, an advertiser may provide criteria that a given advertisement be selected a fixed number of times, after a fixed number of slides, or in a predetermined order. Alternatively, the criteria may include exclusivity requirements such that advertisements from competitors are not selected to be included together in a response to a data feed request. In yet another embodiment, a selection may be made based on a queue, e.g., the next advertisement in a queue may be selected. In yet another embodiment, the selection may include evaluating the information known about the requestor and making a selection based on that information. Other criteria are also possible and any suitable method for selecting an advertisement may be used and is considered within the scope of this disclosure. For example, in a client-based insertion system a criterion may be that an advertisement or set of advertisements be shown a fixed number of times within a specified period of time.

Other criteria are also possible. For example, specific data feeds may be associated with specific advertisements such as house ads, sponsorship ads, context targeting (for example as determined by inspection of the slideshow title, captions, categorizations, and other slideshow metadata). In addition, if a user is known to the advertisement insertion system, criteria related to the user's demographic information and behavioral/historical interest may be used. Such user-related criteria may depend on the ability of the ad selection module to identify the user and associate the user with a user profile or other user metadata. For example, a cookie on the client computer may be used to identify the user with demographic and historical usage data that can then be accessed as part of the ad selection operation 208.

Advertisement items are then created that correspond to the selected advertisements in a generate advertisement item operation 210. The advertisement item created includes information about the advertisement such as the location of the advertisement image (e.g., the URL of the image), a title of the advertisement, format data describing how the advertisement should be displayed, and a textual description of the advertisement. The generated advertisement items are suitable for insertion as a content item into a data feed. For example, in an XML data feed embodiment the XML of a content item may be generated that links to an advertisement so that when rendered the advertisement appears as a slide within the slide show. Such XML, conforming to the RSS, may look like the following:

```
<item>
    <title>AD: Yahoo! Small Business</title>
    <link>http://sbs.smallbusiness.yahoo.com/domains/</link>
    <description>ADVERTISEMENT: What's in a domain name? A
lot more than you might think. Your domain name can be your first
impression, your face to the outside world, and your new marketing
plan.</description>
    <guid isPermaLink="false"></guid>
    <pubDate>Wed, 28 Jun 2006 18:01:32 GMT</pubDate>
    <media:title>AD: Yahoo! Small Business</media:title>
    <media:text>ADVERTISEMENT: What's in a domain name? A
lot more than you might think. Your domain name can be your first
impression, your face to the outside world, and your new marketing
plan.</media:text>
    <media:content type="image/png" url="http://api1-
mig.media.mud.yahoo.com/News/RSSAds/images/15.png"/>
</item>
```

The generate advertisement item operation 210 may also include generating formatting information based on the information contained in the requested data feed. This formatting information may be used to ensure that the slide advertisement, when rendered, displays appropriately within the client device's display.

The generated advertisement item presented above includes as separate elements a text description of the advertisement and a title. Such elements may be included in the database and associated with the advertisement image or may be generated from other information stored in the database. In yet another alternative, the text description may be automatically retrieved from another location based on identifier information maintained in the advertisement database 122.

The generate advertisement item operation 210 may also include generating, based on the information obtained about the selected advertisement, other elements commonly used in data feeds. For example, some RSS specifications include different elements such as an author element, a category element, a comment element, an enclosure element, a unique identifier element, and a publication date element. Each element provides different information. Depending on the embodiment, such elements may be populated with the appropriate data depending on what information is known to the system when the advertisement item is generated.

In addition, another feed element is a URL link to a web page that will open in another browser window conveying more information about the product, service, etc. being advertised. When such a link is activated (by a user event such as clicking on the ad image), the slide show stops until restarted by the user.

In an embodiment, the generate advertisement item operation 210 may also include identifying each advertisement as an advertisement, such as by including the text "AD:" in the title of each generated advertisement item. Other ad identifications may be provided intended to alert either the reader or the device that the rendered page is, in fact, an advertisement.

The method 200 further includes retrieving a copy of the requested data feed in a retrieval operation 212. The retrieval operation 212 may include retrieving a complete copy of the requested data feed. Alternatively, only portions of the requested copy may be retrieved. In yet another embodiment, the requested data feed may not exist as a distinct file or document, but rather exists as an information set including a group of image identifiers that is formatted into a data feed document only when requested, in which case only data from the information set may be retrieved.

The method 200 also includes generating the modified data feed in a create operation 214. As described above, the modified data feed may be created from a template or the modified data feed may be created using a copy of the data feed obtained by the retrieval operation 212 as a starting point. If a template is used, data from the retrieval operation 212 is inserted into the modified data feed at this time or as part of a later operation. Other methods of creating initial modified data feed are also possible.

The method 200 includes identifying a location within the content items of the slide show data feed to insert the advertisement in a location identification operation 216. In an embodiment, the location identified may be a function of the length of the slide show (i.e., the number of content items containing images in the slide show). Alternatively, a fixed location may be used every time. In yet another embodiment, the slide show data feed may be provided with a "dummy" slide that indicates to the system where in the slide show to insert the advertisement. In yet another embodiment, the data feed may contain other information, such as an advertisement element, indicating where in the slide show to insert the advertisement. In yet another embodiment, the location identified may be a simple algorithm based on the number of slides, such as display an advertisement every <n> slides, or a more complicated formula (pseudo random, etc.).

After the location has been identified, the advertisement item is inserted into the XML at the identified location in an insertion operation 218. In an embodiment, the modified data feed already contains the data feed information, such as content items, and the advertisement item or items are pasted into modified data feed at the appropriate location. In another embodiment, upon determination of the proper locations, the modified data feed is populated with all the appropriate data in a single operation. Other methods of creating a modified data feed with content items from a data feed and advertisement items inserted in locations within the content items are also possible and any suitable method of creating such a document or stream of data from the data feed and advertisements is considered within the scope of the disclosure.

The modified data feed is then transmitted to the client in response to the request in a transmission operation 220. The modified data feed, when rendered at the client device, displays the original slides of the slide show data feed with one or more advertisement slides no included in the slide show.

The method 200 further includes recording transaction information in a record operation 222. As discussed above, the transaction information may include information about the advertisement or advertisements included in a modified data feed, information about the client or user requesting the data feed, information about the requested data feed or information derived from any of third party data sources related to the client, the advertisement and the requested data feed.

This transaction information is used in a billing operation 224 to generate and transmit a bill to the client. As discussed above, the size of the bill may be dependent upon the data and transaction information including such data as the number of times an advertisement was inserted into a modified data feed and the client requesting the data feed.

In addition, some of the demographic or other information identifying the client's that are receiving the advertisements may be provided in a provide transaction information operation 226. The information may be used to provide support for the bill or to provide feedback to the advertiser about what market segment is receiving the advertisement.

One skilled in the art will understand that the method 200 described above is but one embodiment and that other embodiments in which the order of the operations may be interchanged and the various elements of each operation combined or separated into other operations. Any such embodiment that achieves the same result from the same basic starting point is considered within the scope of the disclosure.

Figure 6:
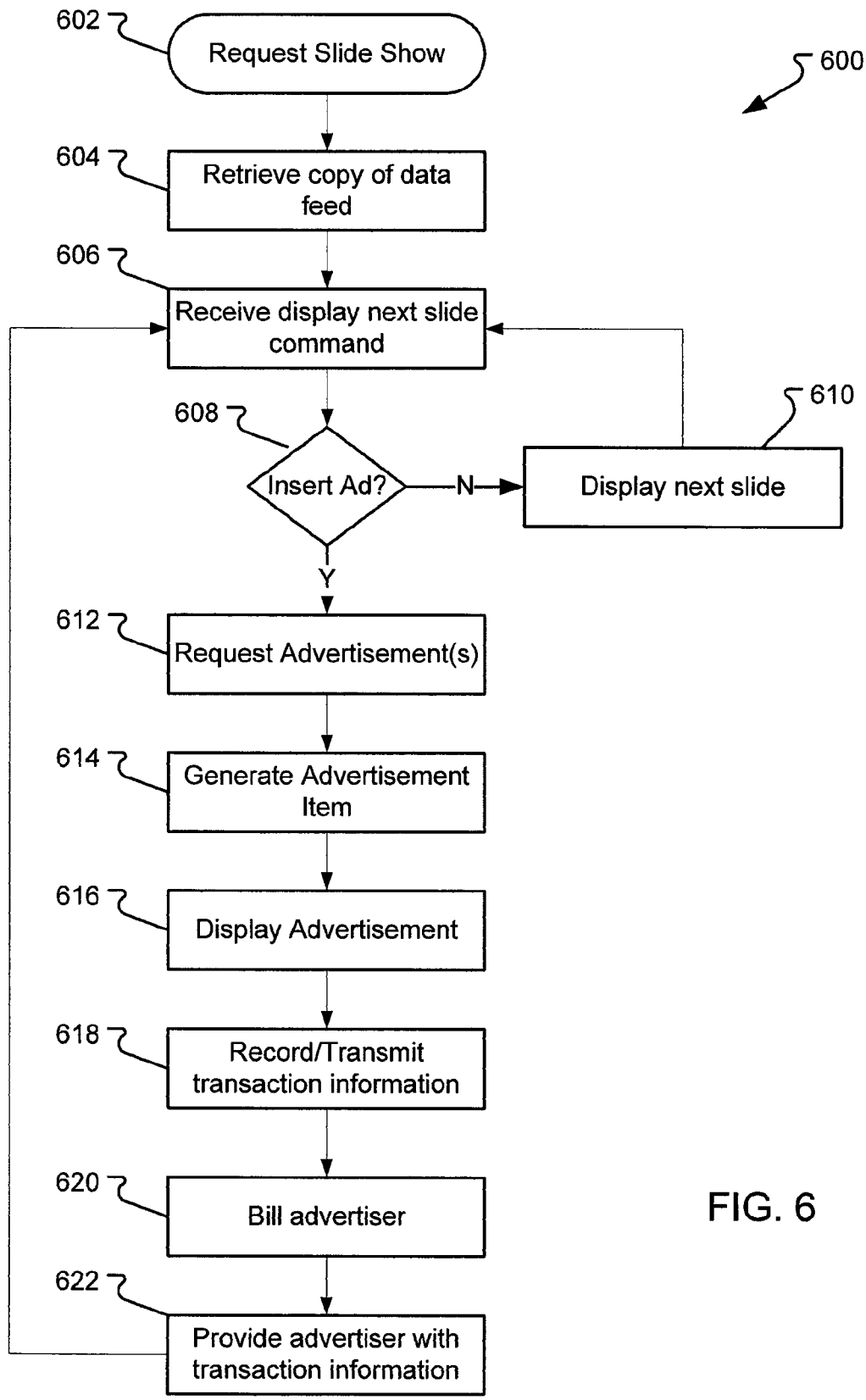
FIG. 6 illustrates a flowchart of an embodiment of a client-side method for inserting advertisements into a slide show.

For example, FIG. 6 illustrates a flowchart of an embodiment of a client-side method for inserting advertisements into a slide show. In the embodiment shown, the method 600 begins with a user request to display a slide show or similar data feed in a request operation 602. In response, the client transmits a request to the data feed's host and thus retrieves the data feed in a retrieve operation 604. The retrieve operation 604 may be performed once as shown (storing all the slides in memory), or in response to each user request to display a slide.

A user then issues a display next slide command to the client which is received in a receive command operation 606. In an embodiment, the requests may be user generated requests, (e.g., mouse-clicks or keystrokes) or may be automated requests (e.g., generated in response to a "display as slide show" user command).

In response, the system then performs a determination operation 608 to determine if a slide or an advertisement should be displayed next. In the determination operation 608, the selection criteria may be accessed along with historical data as part of making the determination of whether to show a slide or an advertisement.

If the determination operation 608 determines that a slide should be displayed next, then a display next slide operation 610 is performed. As mentioned above, depending upon the embodiment this may include retrieving a locally stored slide or retrieving a remote slide using information obtained from the data feed.

If the determination operation 608 determines that an advertisement should be displayed next, then a request advertisement operation 612 is performed. This may include requesting a single advertisement from a remote service. For example, if an advertisement feed is being used as the source of the advertisements, the client may transmit a request for the next item in the feed. Alternatively, a locally stored advertisement may be selected. After the advertisement has been retrieved, a generate advertisement item operation 614 may need to be performed as described with reference to FIG. 2, above. Alternatively, the advertisement may be in a form ready to display.

The advertisement is then displayed in a display operation 616 and information indicating the same is then recorded and ultimately transmitted to a remote service in a transmit operation 618. The transmit operation 618 may occur immediately upon display or may be performed later at a more convenient time. The advertiser is then billed in a bill operation 620 and information provided in a provide information operation 622 as described above with reference to FIG. 2. After displaying the advertisement, the flow returns to the receive display next slide operation 606.

One skilled in the art will recognize that the various operations of the method 600 may be performed in many different sequences while still performing in the desired manner and achieving the desired results of inserting advertisements into the sequence of retrieved items. For example, the advertisements may be retrieved on an as needed basis as shown in FIG. 6 or may be retrieved and stored in batches of advertisements. Similarly, the billing operation 620 and provide information operation 622 may be performed at any time after the display of advertisements and need not be performed after each advertisement display operation 616.

Figure 3:
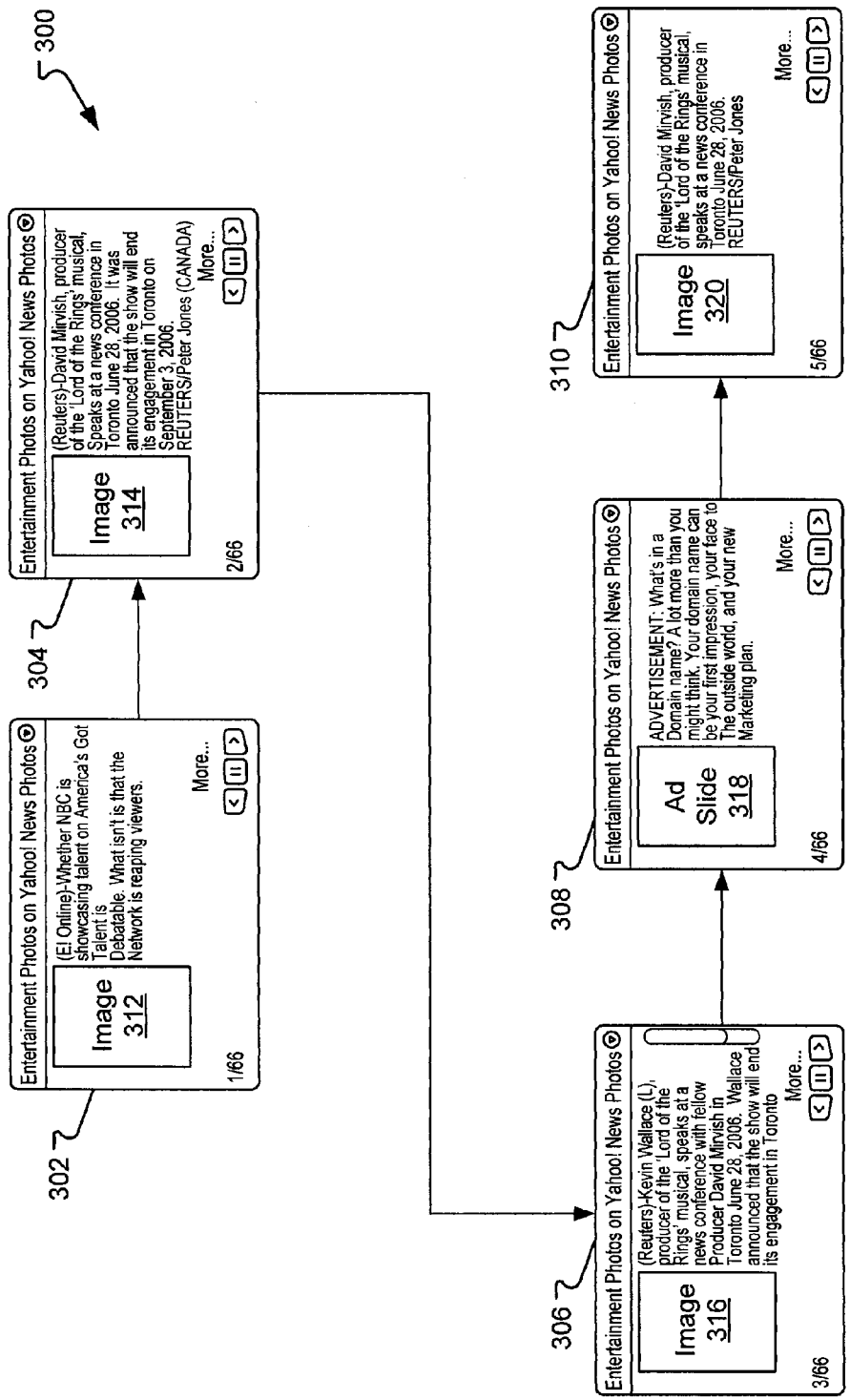
FIG. 3 illustrates the rendering of a slide show data feed created by the methods and systems of this disclosure.

FIG. 3 illustrates the rendering of a slide show data feed created by the methods and systems of this disclosure. In FIG. 3 the first five pages presented by rendering a modified data feed are shown in order. In the embodiment shown, each page rendered as part of the slide show includes an image (the "slide") and a caption of the slide, along with a title bar, a set of navigation controls and slide number indicator. In alternative embodiments, more or less information and types of information may be shown on each rendered based on the desires of and selections made by the data feed creator. For example, a very simple slide data feed show may, when rendered, display only images with no other content at all, or only show the caption when the user hovers over or clicks the slide.

In the example shown in FIG. 3, the first page 302, the second page 304, the third page 306 and the fifth page 310 correspond to content items in the requested slide show data feed. The fourth page 308 is an advertisement page that is displayed when an advertisement item is rendered. The advertisement item is not contained in the requested slide show data feed, but rather was dynamically generated and inserted into the modified data feed. The advertisement page 308 includes an advertisement image and a text description of the advertisement. In the embodiment shown, the other elements on the page are generated from the global format and page setup information that may be included in the header and other locations within the data feed. In the discussion above and throughout this specification, the reader will understand that the word "page" is used in its broadest sense to include not only traditional "web pages" of HTML or XML as displayed by a browser, but also any content displayed to a user by any means, including for example content that is displayed by a widget window, an application other than a browser or within a simple frame.

FIGS. 4A and 4B illustrate the XML code of the modified data feed shown in FIG. 3. In the embodiment shown, the XML conforms to the RSS version 2.0 as described in the header portion 402 of the modified data feed code 400. The modified data feed code 400, in addition to the header 402 includes several content items 406, that could equally be referred to as image items or slide items. In an embodiment, the content items 406 are the same code as that included in the requested data feed 110 for each of the content items 406. In addition to the content items 406 taken from the requested data feed 110, the code 400 includes an advertisement item 404 that was inserted among the content items from the requested data feed 110. As described above, this advertisement item 404 may have been created partially or completely based on information available to the modified data feed generator, or may have been copied from a database.

Figure 7:
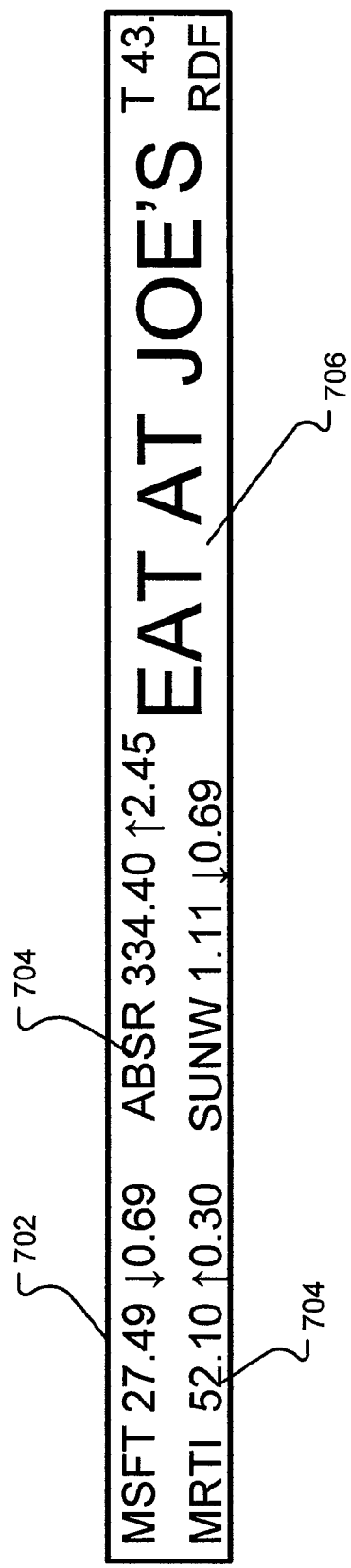
FIG. 7 illustrates a rendered ticker created by the methods and systems of this disclosure.

FIG. 7 illustrates yet another embodiment of an advertisement insertion system adapted for use with data feeds intended to be displayed in the form of a ticker. In the embodiment shown in FIG. 7, the modified data feed is displayed as a ticker 702 (sometimes referred to as a "news ticker" or "crawler" by those in the television industry) of scrolling content, such as text, across a portion of a display on the client computing device. The underlying data feed being displayed may be any data feed or other data format suitable for display using a ticker. For example, the underlying ticker data feed could be in the RSS format or other formal data feed formats or, alternatively, in any data format such as comma-delimited text file, tab-delimited text file, other text file data formats, a spreadsheet format such as .xls file, a raw data formation such as a .dat file, and XML data format. As tickers are well known in the art, any appropriate ticker data feed format may be used.

In addition, the ticker data feed may be a streaming feed in that the data is streamed to the client for immediate display. A stream of such data may have a different format than that used for a data feed that exists as a data file or other non-streaming data structure.

In the embodiment shown, the methods described above, such as with reference to FIGS. 2 and 6, may be used to insert advertisements into a ticker data feed thereby creating a modified ticker data feed that is transmitted to the client or otherwise rendered on the display of the client computing device. In an embodiment, for example, the client computing device includes a ticker rendering application that can interpret the data feed and render the ticker 702 on the display device.

In FIG. 7, a ticker 702 of a data feed containing stock market sales data is illustrated. The ticker 702 displays the familiar stock market sales data. In the embodiment shown, the data is in the form of a separate data item 704 for each sale that includes the stock by its ticker symbol and the share price for the sale. More or less information may be included as desired by the generator of the original ticker data feed.

FIG. 7 illustrates only the ticker portion of the display and it should be pointed out that the ticker 702 could be displayed anywhere on the display, such as in a separate window at the top, bottom or side of the display, in a window just below the toolbars or associated with the toolbars near the top of a display, or in an active portion of a displayed web page. The ticker 702 may be a horizontally or vertically scrolling ticker depending on the ticker rendering application.

The ad insertion system performs the methods as described above to determine if an advertisement should be inserted into the data feed's data. If an advertisement is to be inserted, the ad insertion system selects an appropriate advertisement, generates or otherwise formats the selected advertisement item, creates a modified data feed with the advertisement item inserted at a selected location among the data items of the original data feed, transmits the modified data feed to the rendering device/application, and otherwise performs the accounting and recordation of the transaction.

In this way, the ticker 702, as illustrated in the embodiment shown, contains original data items (e.g., stock symbols and sales data items 704) from the data feed and also the inserted advertisement item(s) 706. The advertisement items 706 may include text, images or other content formatted for display in the ticker 702. For example, in an embodiment a hyperlink may be inserted as an advertisement item 706 so that when the user clicks on the advertisement item 706, a browser may be executed and directed to display a URL associated with the advertisement item 706.

Advertisement items 706 may be selected as described above. For example, advertisement items may be selected based on the data items in the data feed, e.g., an advertisement item associated with General Electric may be selected to run just before or just after the stock symbols and sales data 704 for General Electric. Other ways of identifying a location for an advertisement item have been described elsewhere in this disclosure and any may be used here. For example, an advertisement item may be inserted after every 10, 20 or some other number of data items.

One aspect of the ticker embodiment is that often tickers are used to display data being received or otherwise streamed in real time. In an embodiment, the modified data feed generator receives the ticker data feed in the form of a stream of data items 704 and from it generates a modified stream that contains the advertisement items 706 and at least some of the data items 704. The modified data feed is then streamed to the client for immediate display in real time or storage for later display.

The modified data feed may include a scroll rate adjustment to allow for the additional material. In an alternative embodiment, the scroll rate may not be identified in the data feed, e.g., the ticker rendering software on the client may manage the scroll rate automatically based on user preferences and the amount of data being streamed. Thus, the scroll rate at which the contents of the modified data feed is displayed on the ticker may be automatically adjusted to take into account the additional advertisement items 706.

Those skilled in the art will recognize that the methods and systems of the present disclosure may be implemented in many manners and as such are not to be limited by the foregoing exemplary embodiments and examples. In other words, functional elements being performed by a single or multiple components, in various combinations of hardware and software or firmware, and individual functions, can be distributed among software applications at either the client or server level or both. In this regard, any number of the features of the different embodiments described herein may be combined into single or multiple embodiments, and alternate embodiments having fewer than or more than all of the features herein described are possible. Functionality may also be, in whole or in part, distributed among multiple components, in manners now known or to become known.

Thus, myriad software/hardware/firmware combinations are possible in achieving the functions, features, interfaces and preferences described herein. Moreover, the scope of the present disclosure covers conventionally known manners for carrying out the described features and functions and interfaces, and those variations and modifications that may be made to the hardware or software or firmware components described herein as would be understood by those skilled in the art now and hereafter.

While various embodiments have been described for purposes of this disclosure, various changes and modifications may be made which are well within the scope of the present invention. For example, the disclosed systems and methods could be used to insert advertisements into tickers displaying any type of media such as links to web pages, news stories, news alerts, recently received messages or text, or any other list-based set of content, containing episodic content items meant to be played sequentially. Numerous other changes may be made which will readily suggest themselves to those skilled in the art and which are encompassed in the spirit of the invention disclosed and as defined in the appended claims.

What is claimed is:

1. A method comprising:

receiving, at a computing device over a network, a request from a requesting computing device for a ticker data feed, the ticker data feed containing a stream of at least one or more data items that, when rendered on the requesting computing device, are sequentially displayed in a ticker display window;

determining, in response to said request, via the computing device, that the ticker data feed is to be provided with at least one additional digital content item;

creating, via the computing device, the additional content item based on a format of the ticker data feed, said creation comprising generating the additional content item so that it is formatted according to a format of the data items in the ticker data feed thereby enabling the additional content item to be displayed as part of the ticker data feed when the ticker data feed is displayed, said additional digital content item comprising digital content associated with a third party;

creating, via the computing device, a copy of the ticker data feed based on said determination, said created copy comprising a copy of only each data item contained within said ticker data feed;

retrieving, via the computing device, the created copy of the ticker data feed;

creating, via the computing device, a modified data feed from the retrieved copy of the ticker data feed, the created modified data feed comprising only selected data items in the copy of the ticker data feed;

identifying, upon completion of the creation of the modified data feed, via the computing device, a location relative to the one or more data items in the modified data feed for insertion of the additional digital content item;

modifying, via the computing device, the created modified data feed by inserting, via the computing device, the additional digital content item in the identified location of the created modified data feed, said insertion comprising adjusting, via the computing device, a ticker scroll rate based on a speed of the stream of the modified data feed and a size of the additional digital content item; and communicating, over the network, the modified data feed from the computing device to the requesting computing device upon completion of said insertion, said communication causing, via the computing device, the requesting computing device to sequentially display the data items and the additional digital content item in an order based on said insertion.

2. The method of claim 1 further comprising:
retrieving information describing the additional digital content item.

3. The method of claim 2 further comprising:
generating a description element for the additional digital content item based on the information.

4. The method of claim 3 wherein the one or more data items of the ticker data feed include format data and generating further comprises:
generating format data for the additional digital content item based on the information.

5. The method of claim 1 further comprising:
recording data indicating that the additional digital content item was transmitted to the requesting computing device in response to a request for the ticker data feed.

6. The method of claim 1 further comprising:
providing the third party information identifying the requesting computing device derived from information in the request.

7. A system comprising:
a processor;
a non-transitory computer-readable storage medium for tangibly storing thereon program logic for execution by the processor, the program logic comprising:
communication logic executed by the processor for receiving requests for a ticker data feed, said ticker data feed containing a stream of at least one or more data items for display;
generation logic executed by the processor for accessing the ticker data feed and creating a copy of the ticker data feed, said created copy of the ticker data feed only contains a copy of the data items in said ticker data feed;
generation logic executed by the processor for generating a modified data feed in response to the received requests, the modified data feed containing only selected data items from the created copy of the ticker data feed and at least one advertisement item;
creation logic executed by the processor for creating the additional content item based on a format of the ticker data feed, said creation comprising generating the additional content item so that it is formatted according to a format of the data items in the ticker data feed thereby enabling the additional content item to be displayed as part of the ticker data feed when the ticker data feed is displayed, said additional digital content item comprising digital content associated with a third party;
insertion logic executed by the processor for modifying the created modified data feed by inserting said additional digital content item into said modified data feed, said insertion comprising adjusting a ticker scroll rate based on a speed of the stream of the modified data feed and a size of the additional digital content item; and
communication logic executed by the processor for communicating, upon completion of said insertion, the modified data feed to a requesting device over a network, said communication causing the requesting computing device to sequentially display the data items and the additional digital content item in an order based on said insertion.

8. The system of claim 7 further comprising:
accounting logic executed by the processor for recording information derived from the receiving requests and the created additional digital content item.

9. The system of claim 7 wherein the generated additional digital content item includes a link to a URL associated with the selected advertisement.

10. The system of claim 7 further comprising:
rendering logic executed by the processor for receiving the modified data feed and facilitating rendering of the modified data feed as a ticker.

11. A method comprising:
receiving, at a computing device over a network, a request from a requesting computing device for a first data stream containing a stream of at least one or more items to be displayed in a ticker;
determining, via the computing device, that the first data stream is to be provided with additional digital content items in response to said request;
creating, via the computing device, the additional content item based on a format of the first data stream, said creation comprising generating the additional content item so that it is formatted according to a format of the items in the first data stream thereby enabling the additional content item to be displayed as part of the first data stream when the first data stream is displayed, said additional digital content item comprising digital content associated with a third party;
accessing, via the computing device, the first data stream based on said request and said determination;
creating, via the computing device, a copy of the first data stream upon said accessing, said created copy comprising a copy of only each item to be displayed in the ticker;
creating, via the computing device, a modified data stream, the created modified data stream containing only selected items in the created copy of the first data stream;
identifying, via the computing device, a location among the items in the modified data stream for insertion of the additional digital content item upon completion of the creation of the modified data stream;
modifying, via the computing device, the created modified data feed by inserting, via the computing device, the additional digital content item in the identified location of the created modified data stream, said insertion comprising adjusting, via the computing device, a rendering rate based on a speed of the stream of the modified data stream and a size of the additional digital content item; and
in response to the request for the first data stream and upon completion of said insertion, streaming, from the computing device over the network, the modified data stream to the requesting computing device formatted for display in the ticker, said communication causing, via the computing device, the requesting computing device to sequentially display the items and the additional digital content item in an order based on said insertion.

12. The method of claim 11 further comprising:
recording data identifying that the additional digital content item was transmitted to the requesting computing device in response to a request for the first data stream.

13. The method of claim 11 further comprising:
providing the third party information identifying the requesting computing device derived from information in the request.

14. A non-transitory computer-readable storage medium tangibly encoded with computer-executable instructions, that when executed by a computing device, perform a method comprising:

receiving a request from a requesting computing device over a network for a first data feed, said first data feed containing a stream of at least one or more items to be displayed in a ticker;

determining that the first data feed is to be provided with additional digital content items in response to said request;

creating, via the computing device, the additional content item based on a format of the first data stream, said creation comprising generating the additional content item so that it is formatted according to a format of the items in the first data stream thereby enabling the additional content item to be displayed as part of the first data stream when the first data stream is displayed, said additional digital content item comprising digital content associated with a third party;

creating a copy of the first data feed based on said determination, said created copy comprising a copy of only each item to be displayed in the ticker;

retrieving the created copy of the first data feed;

creating a modified data feed from the created copy of the first data feed, the created modified data feed containing only selected items in the copy of the first data feed;

identifying a location among the items for insertion of the additional digital content item upon completion of the creation of the modified data feed;

modifying the created modified data feed by inserting the additional digital content item in the identified location of the created modified data feed, said insertion comprising adjusting a scroll rate based on a speed of the stream of the modified data feed and a size of the additional digital content item; and in response to the request for the first data feed and upon completion of said insertion, streaming the modified data feed to the requesting computing device formatted for display in the ticker over the network, said communication causing the requesting computing device to sequentially display the items and the additional digital content item in an order based on said insertion.

* * * * *